United States Patent [19]

Dlugos et al.

[11] 4,430,716
[45] Feb. 7, 1984

[54] POSTAGE VALUE DETERMINING SCALE WITH EXPANDABLE MEMORY PORT

[75] Inventors: Daniel F. Dlugos, Huntington; Flavio M. Manduley, Woodbury, both of Conn.

[73] Assignee: Pitney Bowes Inc., Stamford, Conn.

[21] Appl. No.: 277,779

[22] Filed: Jun. 26, 1981

[51] Int. Cl.³ .............................................. G01G 19/40
[52] U.S. Cl. ........................................ 364/466; 177/25
[58] Field of Search ................. 364/466, 900; 177/25, 177/3, 4

[56] References Cited

U.S. PATENT DOCUMENTS

| | | | |
|---|---|---|---|
| 3,635,297 | 1/1972 | Salava | 364/466 X |
| 4,179,747 | 12/1979 | Dlugos | 364/466 X |
| 4,271,470 | 6/1981 | Dlugos et al. | 364/466 |
| 4,291,374 | 9/1981 | Dlugos | 364/466 |
| 4,291,375 | 9/1981 | Wolf | 364/464 X |
| 4,326,254 | 4/1982 | Uchimura et al. | 364/464 X |
| 4,377,214 | 3/1983 | Hansen et al. | 364/466 X |

*Primary Examiner*—Edward J. Wise
*Attorney, Agent, or Firm*—Robert H. Whisker; David E. Pitchenik; William D. Soltow, Jr.

[57] ABSTRACT

A postage value determining scale includes a processor which accesses postage data stored in a rate PROM carried on a card. In a basic implementation, the PROM card is mounted to a memory port socket of a circuit board which carries the processor. The processor is programmed for optional postage value related functions such as zip code to destination zone conversions and postage rate determinations for mailing from a remote origination point. The PROM carried on the rate PROM card has insufficient memory space for the optional functions. When a scale capable of providing the optional features is desired, in lieu of connecting the rate PROM card directly to the memory port, a transition board is provided for connecting the main board to a ribbon cable assembly. The ribbon cable is connected, at its opposite end, to a carrier board having a plurality of sockets and a cage for mounting a plurality of memory carrying cards including the rate PROM card. In order to match the conductor polarity between the memory port socket and the carrier board plug, the conductors of the transition board extend through the board to opposite faces of the board at each end.

14 Claims, 3 Drawing Figures

POSTAGE VALUE DETERMINING SCALE WITH EXPANDABLE MEMORY PORT

BACKGROUND OF THE INVENTION

1. Field of the Invention

This invention relates generally to mailing systems and in particular to a processor implemented postage value determining system having expandable memory capability.

2. Brief Description of the Prior Art

The postage required to send an article of mail from its point of origination to its destination is a function of the distance between these points, its weight, and its class. Processor implemented mail handling systems have provided enhanced efficiency over manual handling methods. Such systems included a scale for weighing the article and loading weight information into a data processor, a keyboard through which destination and class information were entered and a memory which carried postage rate data necessary for a postage value determination. The article destination was usually expressed in terms of destination zone information or the processor was capable of accessing further memory locations to convert zip code entries into destination zone information.

Other features of postage value determining systems associated with scales included the capability of determining the postage required to transport articles to a destination from a remote mailing point and, associated with such features, the ability to convert destination zip codes into corresponding zone information with respect to the remote origination point. A mailing system incorporating such features is described in a copending application of Dlugos et al entitled System and Method for Computing Domestic and International Postage, Ser. No. 070,234 filed Aug. 27, 1979, and assigned to the assignee of the present invention.

While such systems provided versatility, resulted in a reduction of operator errors and generally expedited mail room operating procedures, they were primarily used by large volume mailers in need of sophisticated mailing systems.

Potential users who had no need for a mailing system capable of providing zip code to destination zone conversions for postage value determinations or value determinations based upon remote points of origin were reluctant to acquire processor implemented systems which only offered a complete package of features. Although the cost factor was instrumental, the tendency toward operator errors through inadvertent keyboard entries increased with equipment having features which exceeded the immediate necessities of the purchaser.

SUMMARY OF THE INVENTION

A mailing system includes a processor implemented postage value determining scale. The processor is mounted on a circuit board and receives article weight information from a weigh cell and carrier type, class and article destination information from a keyboard. The processor accesses postage rate data stored in a rate PROM to provide basic postage value determinations. The rate PROM is carried on a printed circuit card which is directly mounted to the circuit board through an expandable memory port socket.

The processor is programmed to provide additional functions such as zip code to destination zone conversions with the scale location as the point of origin as well as zip code to zone conversions with a remote location as the point of origin. To provide the optional features, a ribbon connector is coupled to the memory socket. The ribbon connector extends to a carrier board having a plurality of sockets. Among the cards mounted to the carrier board are a decoder card, the rate PROM card, zip to zone conversion memory cards for the scale location as well as a remote location, an optional program memory, an optional scratch pad memory, and a rate PROM for United Parcel Service charges when the remote origin is at an area having a custom intrastate rate structure.

In order to match the polarity of conductors at the memory port socket and the carrier board plug, a transition board is provided with a plurality of conductors extending through the board to appear on opposite faces of the board adjacent each end.

From the foregoing compendium, it will be appreciated that it is an object of the present invention to provide a postage value determining system of the general character described which is not subject to the disadvantages aforementioned.

It is a further object of the present invention to provide a postage value determining system of the general character described which is relatively low in cost, simple to operate and may be easily upgraded to provide enhanced features.

A further object of the present invention is to provide a postage value determining system of the general character described which may be easily upgraded for enhanced features without requiring reprogramming of its system processor.

Another object of the present invention is to provide a postage value determining system of the general character described including a processor having a postage rate data memory for basic postage value determination features and with the memory being interconnected through an expandable port for interconnection of a plurality of memories when enhanced features are desired.

Yet another object of the present invention is to provide a postage value determining system of the general character described having a system processor which accesses a plurality of memories mounted on a carrier board.

Other objects of the invention in part will be obvious and in part will be pointed out hereinafter.

With these ends in view, the invention finds embodiment in certain combinations of elements and arrangements of parts by which the aforementioned objects and certain other objects are hereinafter attained, all as more fully described with reference to the accompanying drawings and the scope of which is more particularly pointed out and indicated in the appended claims.

BRIEF DESCRIPTION OF THE DRAWINGS

In the accompanying drawings in which is shown one of the various possible exemplary embodiments of the invention.

DESCRIPTION OF THE PREFERRED EMBODIMENT

Figure 1:
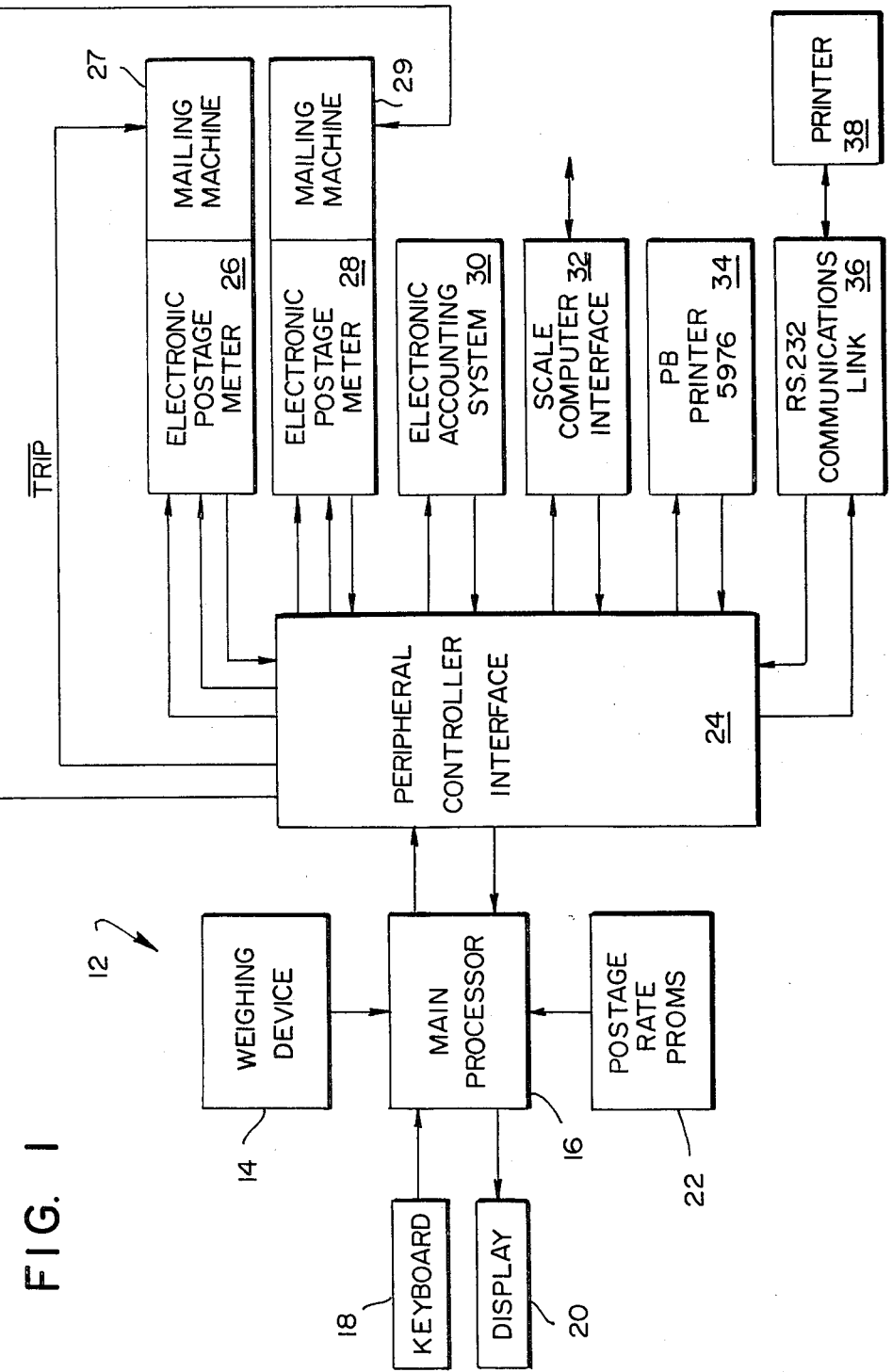
FIG. 1 is a block diagram of a typical automated mailing system employing a postage value determining scale having an expandable memory port in accordance with the present invention and illustrating a basic implementation of the scale for postage value determinations.

Referring now in detail to the drawings, the reference numeral 10 denotes generally an automated mailing system constructed in accordance with and embodying the present invention. The mailing system includes a processor controlled stand alone postage scale 12. The scale 12 is adapted to calculate transportation charges, e.g. U.S. Postal Service and United Parcel Service charges, required to transport an article. As employed herein, the term "postage" denotes transportation charges for articles based upon weight and in many instances class of transportation, size of article and distance to destination charged by a governmental authority or a privately owned carrier. In most circumstances however, postage is based upon the article weight, class of transportation and distance to destination (zone). The scale 12 includes a weighing device 14 having a tray for receiving the article to be mailed. The weighing device 14 carries a load cell 15 which is interconnected to a main system processor 16 through an analog interface 17. The system processor 16 is programmed to compute the requisite postage charges for an article placed upon the tray.

The data necessary for a determination of postage, e.g. destination operands, class of transportation operands, etc., are entered at a keyboard 18 and corresponding signals are transmitted to the system processor 16. Keyboard and calculated information are indicated at a display 20.

With weight, class of transportation and destination zone operands entered, the system processor 16 determines the requisite postage by reference to one or more postage rate PROMS 22 carried on a card and provides a signal to the display 20 for indicating the calculated postage amount. A suitable microprocessor for implementation as the system processor 16 is an Intel 8085 processor available from Intel Corporation of Santa Clara, Calif.

The scale 12 is constructed as a stand alone unit for use without peripheral devices associated with a complete mailing system. A peripheral controller interface 24 may be provided for establishing communications links between the system processor 16 and various optional mailing system peripheral devices. Typical examples of mailing system peripheral devices which may be employed in conjunction with the scale 12 are an electronic postage meter 26 adapted to dispense U.S. Postal Service postage denominations and a further meter 28 adapted to dispense alternate carrier transportation charges, e.g. United Parcel Service. The postage meters 26, 28 set the postage amounts to be imprinted in response to signals transmitted by the peripheral controller interface 24. An associated mailing machine 27, 29 for the meters 26, 28 is employed to trip the respective meters and print the amount set.

Further peripheral devices which may be employed in a composite mailing system 12 include an electronic accounting system 30, a scale computer interface 32 and a Pitney Bowes printer 34. In addition, the peripheral controller interface 24 includes a link 36 for communications through an RS 232 hardware standard to interface with one of several available RS 232 printers 38 in lieu of the printer 34 or any other desired peripheral device which communicates in ASCII code, for example.

The structure and operation of the peripheral controller interface is fully described in a copending related application of Daniel F. Dlugos et al entitled "Postage Scale Peripheral Interface", Ser. No. 235,241, filed Feb. 17, 1981, assigned to the assignee of the present invention and incorporated herein by reference.

Figure 3:
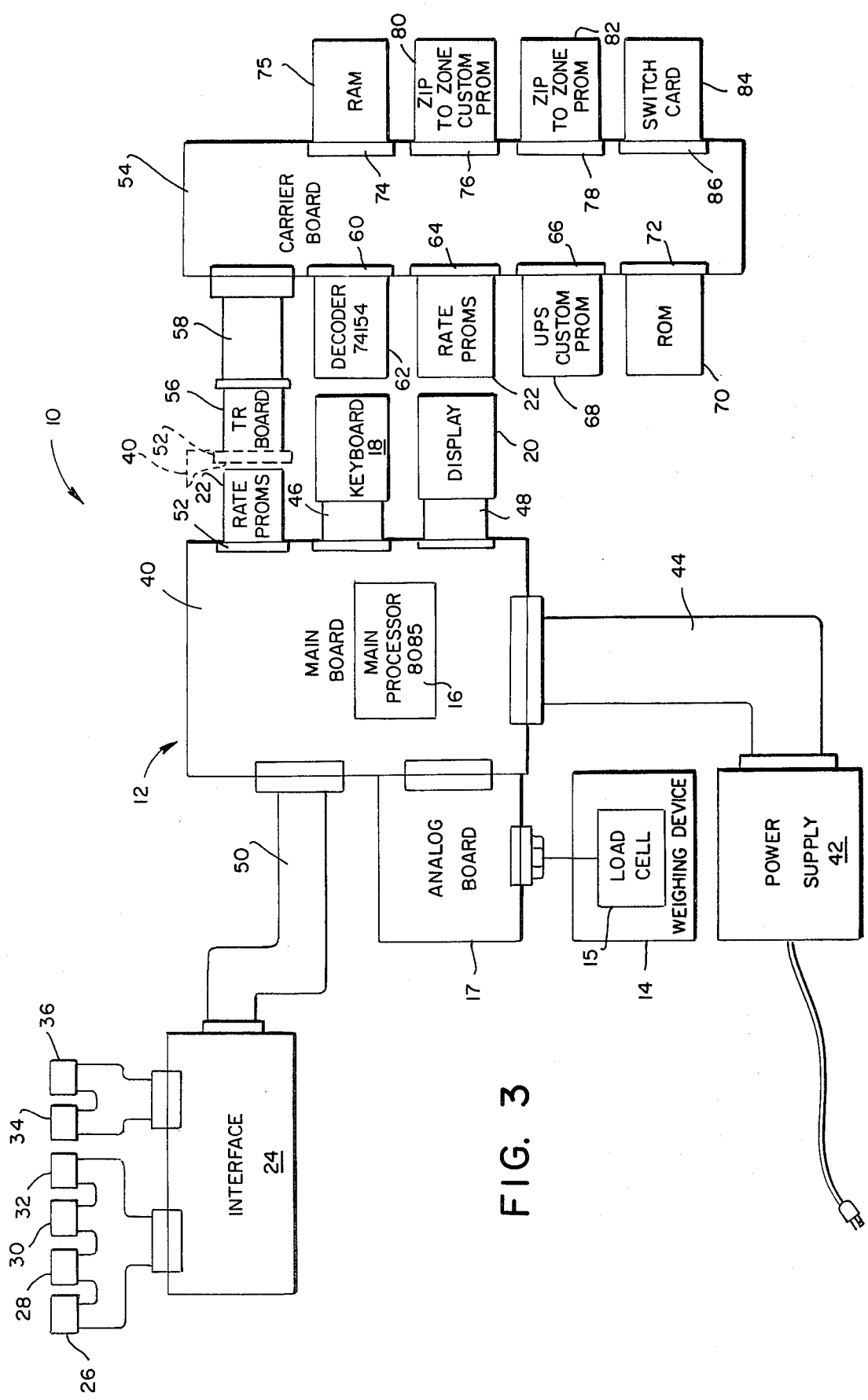
FIG. 3 is a schematized block diagram of the mailing system depicting various circuit boards and the manner in which either a postage rate memory or a plurality of memories mounted to a carrier board are interconnected to a main circuit board through the expandable memory port.

As depicted in FIG. 3, the processor 16 is mounted to a main circuit board 40. The board 40 is interconnected to a power supply 42 by a ribbon connector 44, the keyboard 18 by a ribbon connector 46, the display 20 by a ribbon connector 48, and the interface 24 by a ribbon connector 50. A connector extends from the load cell 15 of the weighing device 14 to the analog circuit board 17 which is directly plugged into a socket of the main board 40. In the basic scale implementation as shown in FIG. 1, the card carrying the rate PROMS 22 is directly received in an expandable memory port socket 52 of the circuit board 40.

With such component arrangement, the main processor 16 functions to receive article weight data from the weighing device 14 and carrier type, class of transportation and destination zone data from the keyboard 18. Thereafter, the processor 16 accesses postal rate data stored in the rate PROMS 22 through an internal decoder (not shown) to generate a requisite postage amount.

If the interface 24 and any of the optional peripheral devices 26 through 38 are employed in conjunction with the scale 12, the processor 16 will generate instructions, transmit data and receive data from the peripheral devices through the controller 24.

As previously mentioned, the processor 16 is programmed to provide optional functions. For example, in instances wherein a destination zone is not known, the processor is capable of accessing a memory and ascertaining the appropriate zone for such destination. A further optional function for which the processor 16 is programmed includes the capability of rendering postage value determinations in instances wherein a remote location is selected as the point of origination for the article being transported. In such instances, the processor is capable of accessing a memory to obtain appropriate destination zone data relative to a remove origination point when only the destination zip code number is known.

Under certain instances when the remote location is within a state wherein special or custom intrastate rates apply in accordance with rate schedules such as those of United Parcel Service, a further rate memory is accessed for generation of the appropriate postal value.

To accommodate user applications wherein some or all of such optional features are desired in a mailing system, the main circuit board 40 includes an expandable memory port. Pursuant to the present invention, the rate PROMS card may be replaced with a link to a carrier board 54 to which the rate PROMS 22 and various memories necessary for the optional features are mounted.

Figure 2:
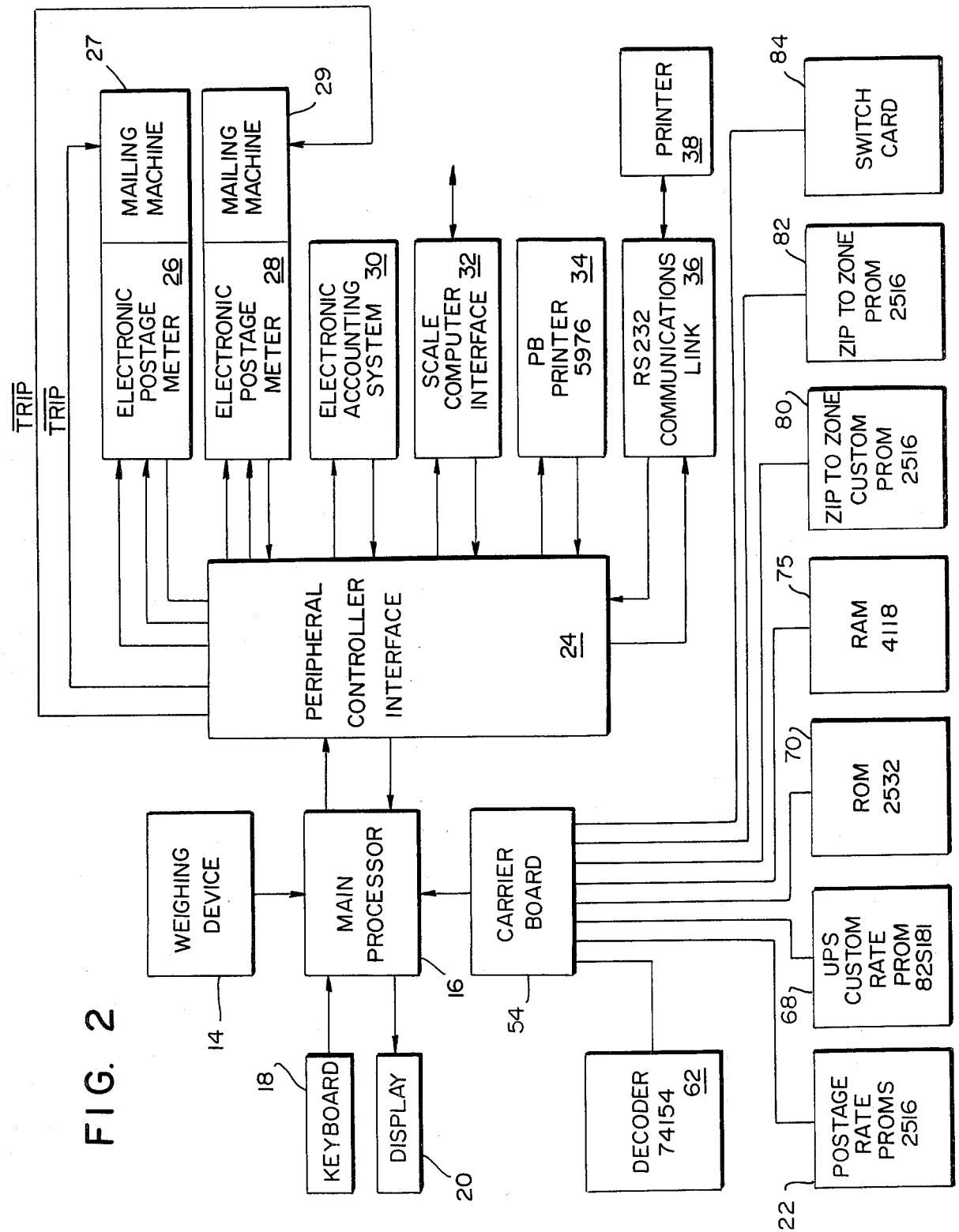
FIG. 2 is a similar block diagram illustrating a mailing system wherein the scale is configured for optional functions and includes a carrier board interconnected to the memory port and a plurality of memories interconnected to the carrier board.

Such optional implementation is illustrated in FIGS. 2 and 3. With reference to FIG. 3, the engagement of the carrier board 54 and the expandable memory port socket 52 is shown with the socket 52 and board 40 in dashed lines. A socket to socket transition board 56 is provided with one of its ends inserted into the socket 52 and its other end inserted into a socket of a ribbon cable assembly 58.

The ribbon cable assembly includes sockets at each of its ends with the transition board 56 received in one socket and a plug extending from the carrier board 54 received in its other socket.

In order to maintain appropriate conductor polarity between the contacts of the memory port socket 52 and the contacts of a connector plug extending from the carrier board 54, the conductors of the transition board 58 extend along opposite faces of the board at opposite ends. For this purpose, plated through holes are employed in the board 56.

The carrier board 54 is provided with a plurality of sockets adapted to receive cards which are accessed by the processor 16 as memory. The cards are supported by a cage structure (not shown) superimposed over the carrier board with all of the cards extending perpendicular to the plane of the carrier board 54 and being parallel to one another rather than as depicted in FIG. 3.

With the carrier board 54 inteconnected to the main board 40 through the expandable memory port socket 52, the processor 16 now accesses the memories on the carrier board rather than the rate PROMS 22 exclusively.

At a first location socket 60 a decoder 62 is connected through a card to which it is mounted. The decoder 62 performs paging functions by receiving signals from the maib board 40 and providing appropriate signals on the chip select line of the various memories connected to the board.

A second location socket 64 is provided on the carrier board 54 for the card carrying the rate PROMS 22. As previously mentioned, postal rate data necessary for a determination of postage is stored in the PROMS 22. As presently employed, the card carries two rate PROMS and, in instances wherein the destination zone is known, the processor 16 will access the rate PROMS 22 carried on the board 54 and execute its postage determining routine in a manner identical to that employed in the basic scale implementation.

At a third location socket 66 an optinal United Parcel Service custom rate PROM may be connected. The custom rate PROM 68 is employed in instances wherein the scale 12 is required to calculate postage values for mailings from a remote location and wherein a unique rate structure is in effect at such location. Such custom rate structures are presently employed by United Parcel Service for intrastate shipments in some states. Once the destination zone is entered and an appropriate key is operator depressed for indication that the postage value is to be calculated on a basis of a remote point of origin, the processor 16 will access the custom PROM 68 rather than the rate PROM 22.

Optional additional program memory may be provided for the processor 16 in the form of a read only memory 70 mounted to a card which is in turn interconnected through a socket 72 at a fourth location on the carrier board. A fifth location socket 74 may be employed to interconnect an optional scratch pad random access memory 75 to the processor 16.

Zip code to destination zone memories are provided at the sixth and seventh location sockets 76, 78, respectively. The socket 76 interconnects the processor 16 with a PROM 80 which stores zip to zone conversion data based upon a mailing from a remote origin. A PROM 82 is interconnected to the processor 16 through the seventh socket 78. The PROM 82 is accessed to obtain zip to zone conversion data vis-a-vis the scale location as the mailing point of origin.

Switches carried on a switch card 84 are read by the processor 16 in order to vector to the location of the proper zip code chart in each zip to zone conversion PROM 80, 82. The switch card is mounted to a socket 86 and includes a pair of switch banks with each switch bank having four switches. One switch bank is employed to locate the zip code chart in the standard zip to zone conversion PROM 82 and the other is employed to locate the zip code chart in the custom zip to zone conversion PROM 80.

It should be appreciated that as presently employed the processor 16 need not access the optional program memory 70 or the optional scratch pad memory 75. Such memories are readily available, however, for future use or modification if expanded features are desired. Further, a mailing system may be provided employing the carrier board 54 with less than all of the memory cards. For example, if a user desires a scale capable of zip to zone conversions and is not engaged in the practice of mailing from remote points of origin, the carrier board would be equipped with the decoder 62, the rate PROMS 22, the zip to zone conversion PROM 82 and the switch card 84 for accessing the proper chart in the zip to zone PROM 82.

In a further configuration, assuming a user mails articles from a remote point of origin, e.g. a bulk mailing center which was not in an area which requires a custom rate PROM, the carrier board 54 would be equipped with the decoder 62, the standard rate PROMS 22, the zip to zone custom PROM 80, the standard zip to zone PROM 82 and the switch card 84.

It should be seen, therefore, that many variations of a basic scale can be provided and additional features easily added without reprogramming the processor 16 by adding additional memory cards to the carrier board 54.

Thus, it will be seen that there is provided a postage value determining system with expandable memory port which achieves the various objects of the invention and which is well suited to meet the conditions of practical usage.

As various changes might be made in the system as set forth herein, it is to be understood that all matter herein described or shown in the accompanying drawings is to be interpreted as illustrative and not in a limiting sense.

Having thus described the invention, there is claimed as new and desired to be secured by Letters Patent:

1. In a postage value determining system comprising a processor, weighing means for introducing article weight information, means for introducing postage value related information, and rate memory means for storing postage rate information, the processor receiving the weight information and the postage value related information, the processor retrieving the postage rate information from the memory means and generating a postage value for an article, the improvement comprising memory port means, the rate memory means being selectively engageable directly with the port means, memory carrier means, the memory carrier means being selectively engageable with the port means, a plurality of postage memory means, the plurality including the rate memory means, the plurality of postage memory means being interconnected to the carrier means, the processor retrieving the postage rate information through the memory carrier means, the memory carrier means including means for selective accessing of any of the postage memory means, whereby the postage value determining system is augmented with additional memories for providing optional functional features.

2. A postage value determining system constructed in accordance with claim 1 wherein the plurality of postage memory means includes memory means for storing postage rate information with respect to a location different from the location of the system.

3. A postage value determining system constructed in accordance with claim 1 wherein the plurality of postage memory means includes memory means for storing postal zone information.

4. A postage value determining system constructed in accordance with claim 3 wherein the zone information is correlated with respect to destination zip code information.

5. A postage value determining system constructed in accordance with claim 1 further including means for interconnecting the memory carrier means and the port means, the interconnecting means including a ribbon cable.

6. A postage value determining system constructed in accordance with claim 5 wherein the port means comprises a multiple conductor socket, the interconnecting means further including a transition board extending between the socket and the ribbon cable.

7. A postage value determining system constructed in accordance with claim 6 wherein the interface board includes a plurality of conductors extending between opposite ends of the board, the conductors extending along opposite faces of the board at opposite ends thereof, whereby conductor polarity is maintained.

8. A postage value determining system constructed in accordance with claim 1 wherein the memory means for storing postage rate data is interconnected directly to the port means whereby a basic postage value determining system which requires minimal memory may be provided at reduced cost.

9. A postage value determining system constructed in accordance with claim 1 wherein the memory carrier means comprises a circuit board.

10. A postage value determining system constructed in accordance with claim 9 wherein the circuit board includes a plurality of sockets, each of the plurality of memory means being positioned on a card, each of the cards being engaged in a socket.

11. A postage value determining system constructed in accordance with claim 1 wherein the means for accessing any of the plurality of postage memory means comprises a decoder.

12. A postage value determining system constructed in accordance with claim 1 wherein the plurality of postage memory means includes read only memory means for storing program information.

13. A postage value determining system constructed in accordance with claim 1 further including a postage scale housing, the system being carried by the scale housing.

14. A postage value determining scale constructed in accordance with claim 13 wherein the means for introducing postage value related information comprises a keyboard.

* * * * *